June 9, 1964 D. R. TAYLOR, JR 3,136,951

COMBINED HORIZONTAL OSCILLATOR AND SOUND IF AMPLIFIER

Filed March 29, 1962

INVENTOR.
DONALD R. TAYLOR, JR.
BY
Fordyce A. Bothwell
ATTORNEY 3,136,951
Patented June 9, 1964

3,136,951

COMBINED HORIZONTAL OSCILLATOR AND SOUND IF AMPLIFIER

Donald R. Taylor, Jr., Philadelphia, Pa., assignor to Philco Corporation, Philadelphia, Pa., a corporation of Delaware Filed Mar. 29, 1962, Ser. No. 183,571
6 Claims. (Cl. 325—491)

This invention relates to television receivers and more particularly to the horizontal scanning circuits of such receivers which commonly employ a multivibrator as the horizontal oscillator.

As is well known, a television receiver necessarily comprises many electrical components including a large numbr of vacuum tubes or transistors. This is due to the fact that many functions are required to be performed in order to translate the received composite video signal into a satisfactory picture and to reproduce the transmitted sound. Simplification without sacrifice of performance has been a continuing objective in the art, since obviously it reduces the cost of manufacture and it also reduces the cost and inconvenience incident to service maintenance.

The principal object of the present invention is to effect simplification in a television receiver.

A more specific object of the invention is to effect simplification by providing apparatus capable of serving both as a horizontal oscillator and as a sound IF amplifier.

In one embodiment of this invention the common form of multivibrator employing two triodes is made to serve as a sound IF amplifier by supplying the sound IF signal continuously to both triodes and by deriving the signal from the outputs of both triodes. In another embodiment of the invention a multigrid tube is employed, some elements of which are connected to provide multivibrator action and some of which constitute a pentode amplifier, and the tube is made to serve both for multivibrator operation and for sound IF amplification.

The invention may be fully understood from the following detailed description with reference to the accompanying drawing wherein—

Figure 1:
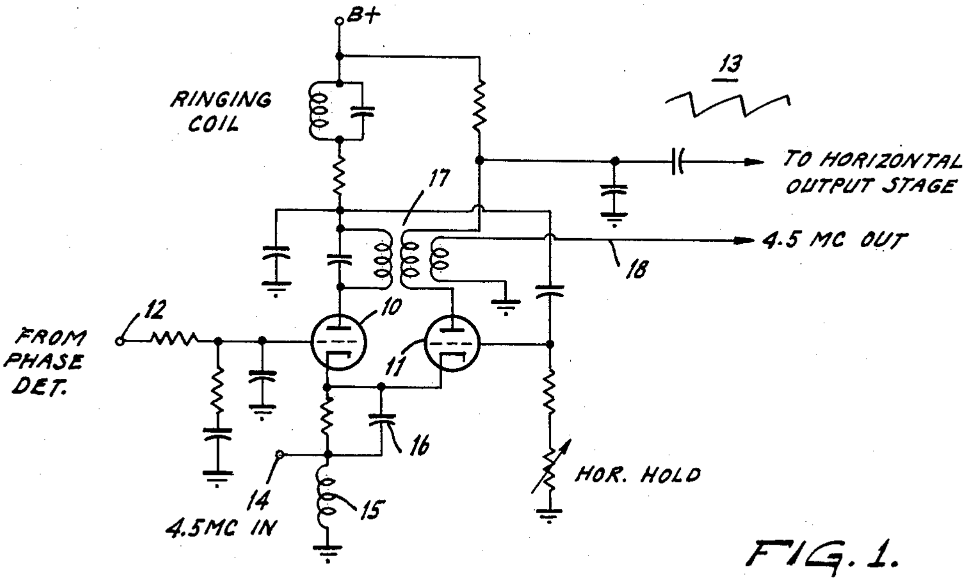
Figure 2:
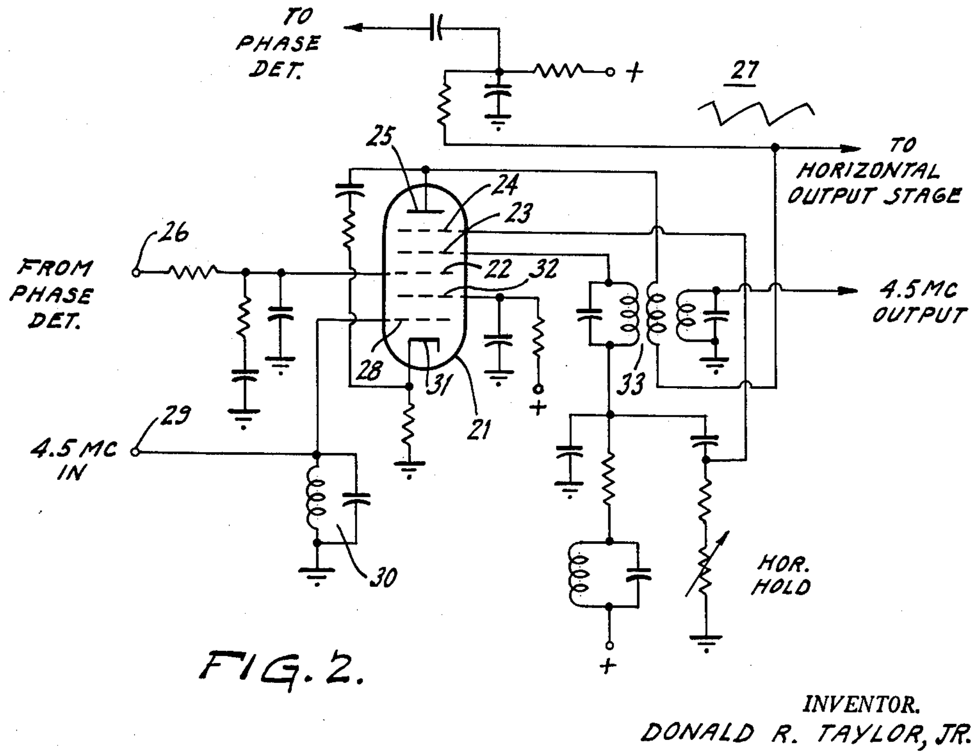

FIG. 1 is a schematic illustration of the horizontal oscillator portion of a television receiver embodying the present invention; and FIG. 2 is a similar illustration of another embodiment of the invention.

Referring first to FIG. 1, there is shown a horizontal multivibrator which is conventional except for the embodiment of the present invention therein. The multivibrator shown includes two tubes (or tube sections) 10 and 11, although it will be apparent that transistors could be employed in this embodiment. The operating frequency of the multivibrator is controlled by a D.C. control voltage applied to terminal 12 from the usual phase detector. For the present purpose it suffices to note that in operation of the multivibrator the two tubes 10 and 11 are alternately operative to produce the sawtooth signal 13 which is supplied to the horizontal output stage.

In accordance with this invention, the 4.5 mc. sound IF signal, which is present in the conventional intercarrier sound receiver, is supplied simultaneously and continuously to the inputs of both tubes. Since the tubes operate alternately, continuous amplifications of the 4.5 mc. signal is achieved.

In the illustrated embodiment, the 4.5 mc. signal is applied by way of input terminal 14 across an inductor 15 which is included in the common cathode circuit for the two tubes. This mode of operation eliminates the need for neutralization. An RF by-pass capacitor 16 provides a low impedance path for the 4.5 mc. current. The amplified 4.5 mc. signal is derived from a tuned transformer 17 having bifilar windings included respectively in the plate circuits of the tubes. Thus the amplified 4.5 mc. signal appearing at the output connection 18 is derived from a load which is common to the plate circuits of the two tubes.

With the arrangement provided by this invention it is possible to provide continuous amplified 4.5 mc. signal with no appreciable horizontal modulation. Thus by this invention the horizontal multivibrator is made to serve additionally as an amplifier for the 4.5 mc. sound IF signal, and the need for a separate sound IF amplifier is eliminated.

Referring now to FIG. 2, there is shown another embodiment of the invention in which a pentagrid tube 21 is employed. Grids 22, 23 and 24 and the plate 25 are connected to form a multivibrator whose operation is like that of the double triode multivibrator. Grids 22 and 24 function as control electrodes, grid 23 functions as the normally "on" electrode, and the plate 25 functions as the normally "off" electrode. The operating frequency of the multivibrator is controlled by a D.C. control voltage applied to terminal 26 from the phase detector. The multivibrator operation, which produces the sawtooth signal 27, has been demonstrated experimentally.

The 4.5 mc. sound IF signal is applied to grid 28 by way of terminal 29 and tuned input 30. The cathode 31 and the first four grids constitute a pentode amplifier at 4.5 mc., grid 32 being the screen grid, grid 22 serving as the suppressor, and grid 23 serving as the anode. Thus grids 22 and 23 serve dual purposes. The amplified 4.5 mc. signal is derived from tuned transformer 33 which has bifilar windings connected to grid 23 and plate 25. By this arrangement the 4.5 mc. output is derived both from grid 23 and from the plate 25. It has been found that in a multigrid tube such as the pentagrid tube shown, the first grid has exclusive control of the total space current and the other grids only determine the division of current at a receiving electrode such as grid 23. Hence in this instance by deriving the 4.5 mc. output from the plate 25 as well as from grid 23 the 4.5 mc. output is caused to be free of horizontal modulation.

Thus in the embodiment of FIG. 2 the multigrid tube is made to serve both for multivibrator operation and for sound IF amplification.

While certain embodiments of the invention have been illustrated and described, it will be understood that the invention is not limited thereto but contemplates such modifications and further embodiments as may occur to those skilled in the art.

I claim:

1. In a scanning system for a television receiver, a signal-controlled multivibrator including two signal amplifier means which are alternately operative during the multivibrator operation, means for supplying a control signal to one of said amplifier means, means for deriving from the other amplifier means an output signal produced by the multivibrator operation, means for supplying sound IF signal as an input to both of said amplifier means, and output means common to said two amplifier means for deriving amplified sound IF signal by virtue of the alternate operation of said two amplifier means.

2. In a scanning system for a television receiver, a signal-controlled multivibrator including two signal amplifier triodes which are alternately operative during the multivibrator operation, means for supplying a control signal to one of said triodes, means for deriving from the other triode an output signal produced by the multivibrator operation, means for supplying sound IF signal as an input to both of said triodes, and output means common to said two triodes for deriving amplified sound IF signal by virtue of the alternate operation of said two triodes.

3. A system according to claim 2, including an impedance element common to the input circuits of said triodes, said sound IF signal being supplied as an input across said element.

4. A system according to claim 3, wherein said triodes are vacuum tube triodes and said impedance element is common to the cathode circuits of the two triodes.

5. In a scanning system for a television receiver; a signal-controlled multivibrator comprising two vacuum tube triodes, a common cathode resistor connected in circuit with the cathodes of said two triodes, and means providing signal coupling from the anode of one of said triodes to the grid of the other triode; means for supplying a control signal to the grid of said one triode; means for deriving from the anode of said other triode a signal produced by multivibrator operation; an inductor in series with said resistor; means for supplying sound IF signal across said inductor; and output means common to said two triodes for deriving amplified sound IF signal by virtue of alternate operation of said two triodes.

6. In a scanning system for a television receiver, a pentagrid electron tube having a cathode and an anode between which five grids are arranged in succession, a resistor connected between said cathode and ground, means for supplying sound IF signal to the first grid, means connecting the second grid to a source of positive potential, means for supplying a control signal to the third grid, means providing signal coupling between the fourth and fifth grids to effect multivibrator operation in response to said control signal, means for deriving from said anode a signal produced by the multivibrator operation, and output means coupled to said fourth grid and said anode for deriving amplified sound IF signal by virtue of said multivibrator operation.

References Cited in the file of this patent

UNITED STATES PATENTS

| | | |
|---|---|---|
| 2,066,333 | Carrauthers | Jan. 5, 1937 |
| 2,342,492 | Rankin et al. | Feb. 22, 1944 |
| 2,456,029 | Snyder | Dec. 14, 1948 |
| 2,859,336 | Cluwen | Nov. 4, 1958 |

FOREIGN PATENTS

| | | |
|---|---|---|
| 446,497 | Great Britain | Apr. 27, 1936 |